United States Patent
Kim et al.

(10) Patent No.: US 8,384,955 B2
(45) Date of Patent: Feb. 26, 2013

(54) METHOD, APPARATUS, AND IMAGE FORMING SYSTEM TO PROCESS ADDITIONAL DATA OF PRINTING JOB

(75) Inventors: Hyou-jin Kim, Anyang-si (KR); Sang-hyup Lee, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 748 days.

(21) Appl. No.: 12/368,437

(22) Filed: Feb. 10, 2009

(65) Prior Publication Data

US 2009/0296115 A1 Dec. 3, 2009

(30) Foreign Application Priority Data

May 30, 2008 (KR) .................. 10-2008-0051015

(51) Int. Cl.
*G06K 15/00* (2006.01)
*H04N 1/40* (2006.01)
*H04N 1/60* (2006.01)

(52) U.S. Cl. .............. 358/2.1; 358/1.9; 358/3.28
(58) Field of Classification Search ............ 358/2.1, 358/1.15, 1.9, 1.12, 1.11, 3.28; 399/167, 399/91, 100; 400/62; 283/93, 72, 86, 902, 283/114

See application file for complete search history.

(56) References Cited

U.S. PATENT DOCUMENTS

| 6,817,289 | B1 | 11/2004 | Liebenow |
| 7,131,775 | B2 * | 11/2006 | Uchida et al. .................. 400/62 |
| 7,532,842 | B2 * | 5/2009 | Handa et al. .................. 399/167 |
| 2008/0080000 | A1 | 4/2008 | Kadota |
| 2008/0158578 | A1 * | 7/2008 | Kadota ......................... 358/1.9 |
| 2008/0198395 | A1 * | 8/2008 | Miyata .......................... 358/1.9 |
| 2009/0033976 | A1 * | 2/2009 | Ding ............................ 358/1.15 |

FOREIGN PATENT DOCUMENTS

JP 2004240748 8/2004

OTHER PUBLICATIONS

European Search Report Issued on Sep. 6, 2012 in EP Patent Application No. 09156907.9.

* cited by examiner

*Primary Examiner* — Charlotte M Baker
(74) *Attorney, Agent, or Firm* — Stanzione & Kim, LLP

(57) ABSTRACT

A method, apparatus, and image forming system to process additional information in a printing task. The method includes receiving a printing task which includes data to be printed, determining whether the received printing task includes additional information, and, if the printing task includes additional information, printing out the data to be printed and the additional information after changing color of the data to be printed or the additional information according to a printing mode. Thus, unnecessary driving of a driving unit of a color image forming device due to additional information added to a printing task can be prevented.

23 Claims, 3 Drawing Sheets

METHOD, APPARATUS, AND IMAGE FORMING SYSTEM TO PROCESS ADDITIONAL DATA OF PRINTING JOB

CROSS-REFERENCE TO RELATED APPLICATIONS

This application claims the benefit of Korean Patent Application No. 10-2008-0051015, filed on May 30, 2008, in the Korean Intellectual Property Office, the disclosure of which is incorporated herein in its entirety by reference.

BACKGROUND OF THE INVENTION

1. Field of the Invention

The present general inventive concept relates to a method, an apparatus, and an image forming system to process additional data of printing jobs, and more particularly, to a method, an apparatus, and an image forming system to change the color of additional information added to printing tasks and printing the printing tasks.

2. Description of the Related Art

According to the type of data to be printed, additional data including either images or text may be added to data to be printed for reasons such as security, document identification, document origin identification, etc. Accordingly, additional data added to initial data to be printed for the reasons described above is referred to as additional information. Once a printing task is generated by adding additional information to initial data to be printed, the initial data to be printed and the additional information are printed together. Generally, in a color image forming device capable of forming color images, a physical method of processing data to be printed varies according to a printing mode for data to be printed, that is, a color printing mode or a monochrome printing mode. For example, in a color image forming device using a multi-pass system, four revolutions of a driving unit are required for printing out data in the color printing mode, whereas only one revolution is required for printing out data in the monochrome printing mode. Accordingly, a physical method of processing data to be printed varies according to a printing mode for data to be printed in a color image forming device capable of forming color images, that is, the color printing mode or the monochrome printing mode. Therefore, when the printing mode for initial data to be printed is the monochrome printing mode requiring only one revolution of the driving unit of an image forming device, if a printing task in which additional information, whose printing mode is the color printing mode, is added to the initial data to be printed, the driving unit of the image forming device is required to revolve four times to carry out the printing task due to the additional information. Furthermore, even if the printing mode for initial data to be printed is the color printing mode, there may be a case in which the initial data can be printed with two revolutions of the driving unit. However, if additional information requiring four revolutions of the driving unit to be printed is added to the initial data, the color image forming device is required to revolve the driving unit four times to perform the printing task due to the additional information.

SUMMARY OF THE INVENTION

The present general inventive concept provides an apparatus and method to process additional information in a printing task, the apparatus and method capable of preventing reduction of the lifespan of a color image forming device when a driving unit of the color image forming device is unnecessarily driven due to the additional information added to the printing task. The present general inventive concept also provides a computer readable recording medium having recorded thereon a computer program for executing the method.

Additional aspects and utilities of the present general inventive concept will be set forth in part in the description which follows and, in part, will be obvious from the description, or may be learned by practice of the general inventive concept.

Embodiments of the present general inventive concept provide a method of processing additional information in a printing task, the method including receiving a printing task which comprises data to be printed; determining whether the received printing task comprises additional information; and, if the printing task comprises additional information, printing out the data to be printed and the additional information after changing color of the data to be printed or the additional information according to a same printing mode.

Embodiments of the present general inventive concept also provide a computer readable recording medium having recorded thereon a computer program to execute the above described method.

Embodiments of the present general inventive concept also provide an apparatus to process additional information in a printing task, the apparatus including: a data reception unit to receive a printing task including data to be printed; an image processor to change color of the data to be printed or additional information according to a printing mode, if the printing task comprises the additional information; and an image forming unit to print out the data to be printed and the additional information, colors of which are changed.

Embodiments of the present general inventive concept also provide an image forming system to process additional information of a printing task, the image forming system including: a host device having a first application to generate data to be printed and a second application to generate additional information and transmit a printing task including the generated data to be printed and the additional information; and a printer device which receives the printing task, changes color of the data to be printed or the additional information, and prints out the data to be printed and the additional information.

Embodiments of the present general inventive concept also provide an image forming system to process additional information of a printing task, the image forming system including: a host device which generates data to be printed and transmits a printing task including the data to be printed; a server which receives the printing task, adds additional information to the received printing task, and transmits the printing task including the additional information to a printer device; and the printer device which receives the printing task from the server, changes color of the data to be printed or the additional information according to a printing mode, and prints out the data to be printed and the additional information.

According to the method above, a printing task which includes data to be printed is received. Then, it is determined whether the received printing task includes additional information. If the printing task includes additional information, the data to be printed and the additional information are printed out after changing color of the data to be printed or the additional information according to a printing mode. Thus, unnecessary driving of a driving unit of a color image forming device due to additional information added to a printing task can be prevented. Furthermore, printing modes of the data to be printed and the additional information may be changed to a predetermined printing mode or a printing mode set by a user.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
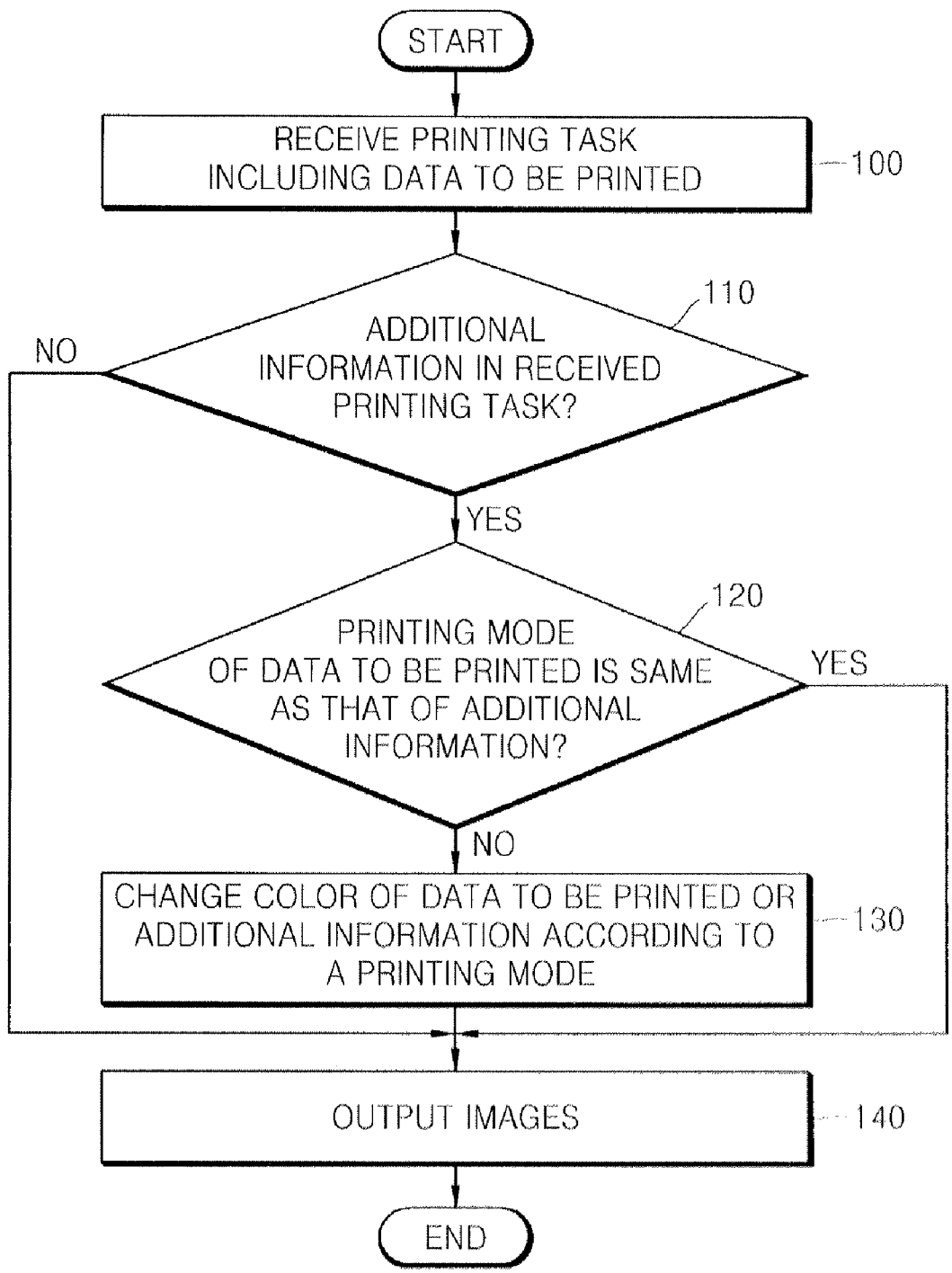
FIG. 1 is a flowchart showing a method of processing additional information of a printing task, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a flowchart showing a method of processing additional information of a printing task, according to an embodiment of the present general inventive concept.

In operation 100, a printing task including data to be printed is received. Here, the printing task may be received via a device such as a host which generates the printing task, a server, a device in which the printing task is stored such as a cellular phone or a digital camera, or a separate storage device such as a universal serial bus (USB) memory stick or a memory card. Furthermore, the data to be printed may be received by loading the data stored inside a color image forming device.

In operation 110, it is determined whether the received printing task includes additional information. According to the type of the data to be printed, additional information formed of images or text for reasons such as security, document identification, document origin identification, etc., can be added to the data to be printed. Accordingly, data added to the initial data to be printed, for reasons such as security, document identification, document origin identification, etc., is referred to as additional information. The additional information may be printed at a location distinguishable from the initial data to be printed, such as below or above the initial data to be printed. Furthermore, the additional information may be generated by an application program inside a host device or may be generated by an application program inside a separate managing device external to the host device. If it is determined in operation 110 that additional information is included in the printing task, operation 120 is performed. Furthermore, if the printing task includes additional information, it may be displayed that the additional information is included in the printing task. In contrast, if it is determined in operation 110 that the printing task does not include additional information, operation 140 is performed.

In operation 120, it is determined whether a printing mode for the data to be printed and a printing mode for the additional information are the same. Here, the term printing mode refers to the number of colors required to form images of data. Examples of printing modes include a color printing mode in which black, yellow, magenta, and cyan are used, and a monochrome printing mode in which only black is used. Therefore, if the printing mode for data is the monochrome printing mode, an image formed of black color only is printed. In contrast, if the printing mode for data is the color printing mode, an image formed of various colors is printed. If it is determined in operation 120 that the printing mode for the initial data to be printed and the printing mode for the additional information are the same, operation 140 is performed. If not, operation 130 is performed.

In operation 130, the color(s) of the initial data to be printed or the color(s) of the additional data is changed to be printed in the same printing mode. In this case, the printing mode for the additional information may be changed according to the printing mode for the initial data to be printed, and then the color of the additional information may be changed according to the changed printing mode. Furthermore, the printing mode for the initial data may be changed according to the printing mode for the additional information, and then the color of the initial data to be printed may be changed according to the changed printing mode. Meanwhile, the color of the initial data to be printed and the additional information may also be changed according to a predetermined printing mode. In this case, the predetermined printing mode may be either a color printing mode or a monochrome printing mode.

In operation 140, images are output. Either the printing task with colors changed via operation 130 or a printing task with no color changes is output. Here, the outputting operation includes not only printing the images on recording media, such as, for example, paper, but also storing the images inside/outside a printing device. Therefore, the stored images may be transmitted to another connected device via a network and printed from another device.

Figure 2:
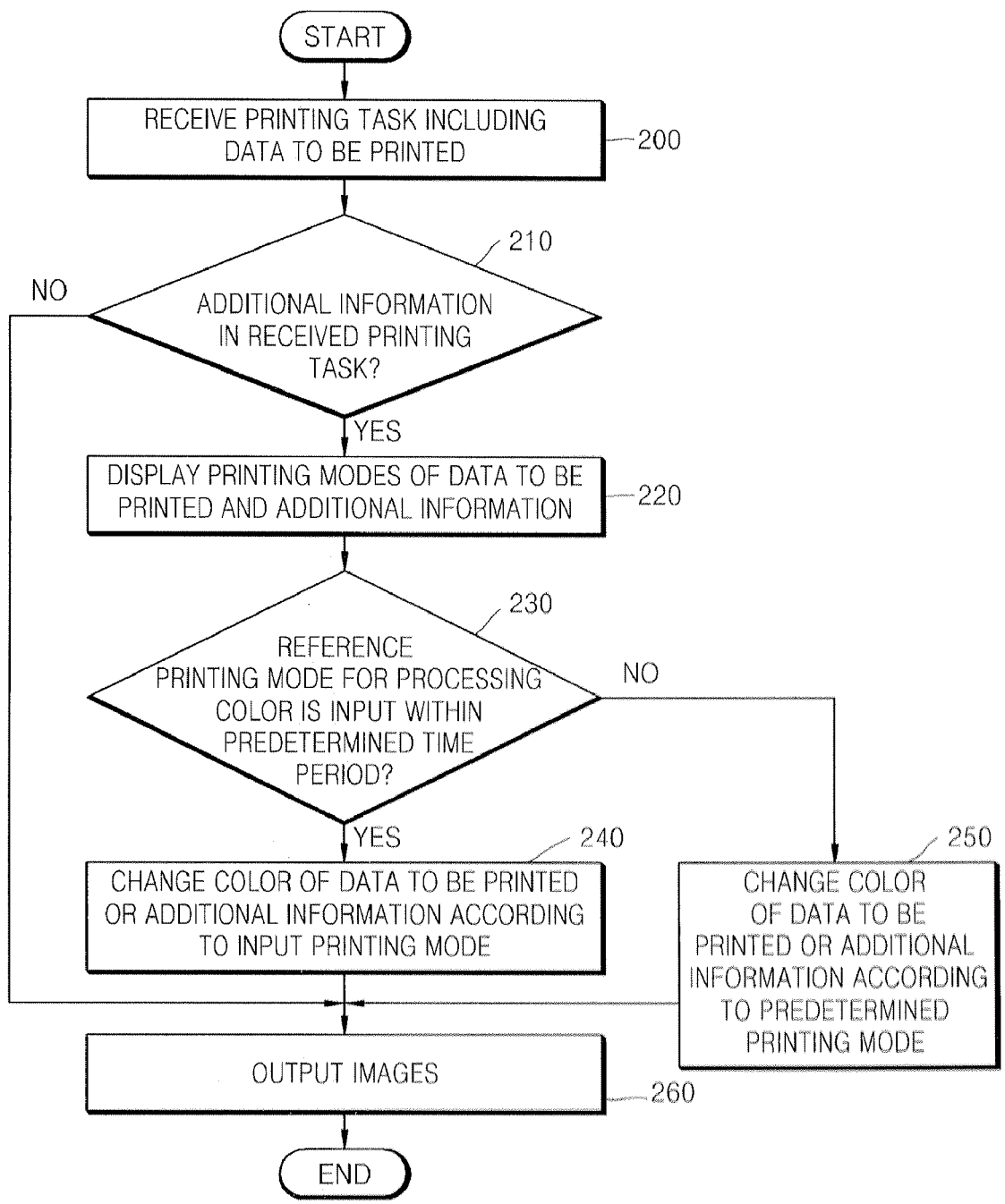
FIG. 2 is a flowchart showing another method of processing additional information of a printing task, according to another embodiment of the present general inventive concept.

FIG. 2 is a flowchart showing another method of processing additional information of a printing task, according to another embodiment of the present general inventive concept.

In operation 200, a printing task including data to be printed is received. Here, the printing task may be received via a device such as a host which generates the printing task, a server, a device in which the printing task is stored such as a cellular phone or a digital camera, or a separate storage device such as a universal serial bus (USB) memory stick or a memory card. Furthermore, the data to be printed may be received by loading the data stored inside a color image forming device.

In operation 210, it is determined whether the received printing task includes additional information. According to the type of the data to be printed, additional information formed of images or text for reasons such as security, document identification, document origin identification, etc., can be added to the data to be printed. Accordingly, data added to the initial data to be printed for reasons such as security, document identification, document origin identification, etc., is referred to as additional information. The additional information may be printed at a location distinguishable from the initial data to be printed, such as below or above the initial data to be printed. Furthermore, the additional information may be generated by an application program inside a host device or may be generated by an application program inside a separate managing device external to the host device. If it is determined in operation 210 that additional information is included in the printing task, operation 220 is performed. Furthermore, if the printing task includes additional information, it may be displayed that the additional information is included in the printing task. In contrast, if it is determined in operation 210 that the printing task does not include additional information, operation 260 is performed.

In the operation 220, a printing mode for the initial data to be printed and a printing mode for the additional information are displayed. Thus, the printing modes of the initial data to be printed and the additional information can be determined. Furthermore, the printing modes of the initial data to be printed and the additional information can be displayed on an image forming device to perform the received printing task or an external device that can be connected to the image forming device. Here, the external device includes a display unit capable of displaying printing modes. Furthermore, a user interface via which selection of a printing mode can be input is provided, and it is also possible to set a reference printing mode for processing color.

Figure 3:
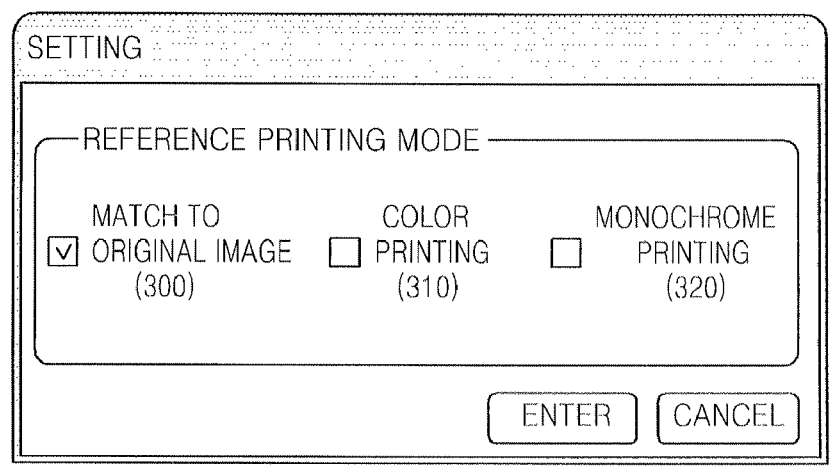
FIG. 3 is a diagram illustrating a menu screen to select a reference printing mode to process color, according to an embodiment of the present general inventive concept.

FIG. 3 is a diagram illustrating a menu screen to select a reference printing mode to process color, according to an embodiment of the present general inventive concept. In FIG. 3, a reference printing mode to process color can be selected.

Referring back to FIG. 2, in operation 230, it is determined whether selection of a reference printing mode to process color is input within a predetermined time period. If it is determined that the selection of a reference printing mode to process color is input within the predetermined time period, operation 240 is performed. If not, operation 250 is performed.

In operation 240, color of the initial data to be printed or the additional information is changed according to the input printing mode. In FIG. 3, if 'Match to Original Image' is selected, color of the initial data to be printed or the additional information is changed according to a printing mode of the initial data to be printed. Meanwhile, if 'Color Printing' is selected, color of the initial data to be printed or the additional information is changed to live colors. Furthermore, if 'Monochrome Printing' is selected, a color of the initial data to be printed or the additional information is changed to black.

In the operation 250, a color of the initial data to be printed or the additional information is changed according to a predetermined printing mode. Here, the predetermined printing mode may be changed by input of a user and/or input of a manufacturer. The predetermined printing mode may be either a color printing mode or a monochrome printing mode. Furthermore, the predetermined printing mode may be a printing mode for either the initial data to be printed or the additional information.

In operation 260, images are printed. Either a printing task including initial data to be printed and additional information, colors of which are changed via operations 240 and 250, or a printing task without color change is printed.

Figure 4:
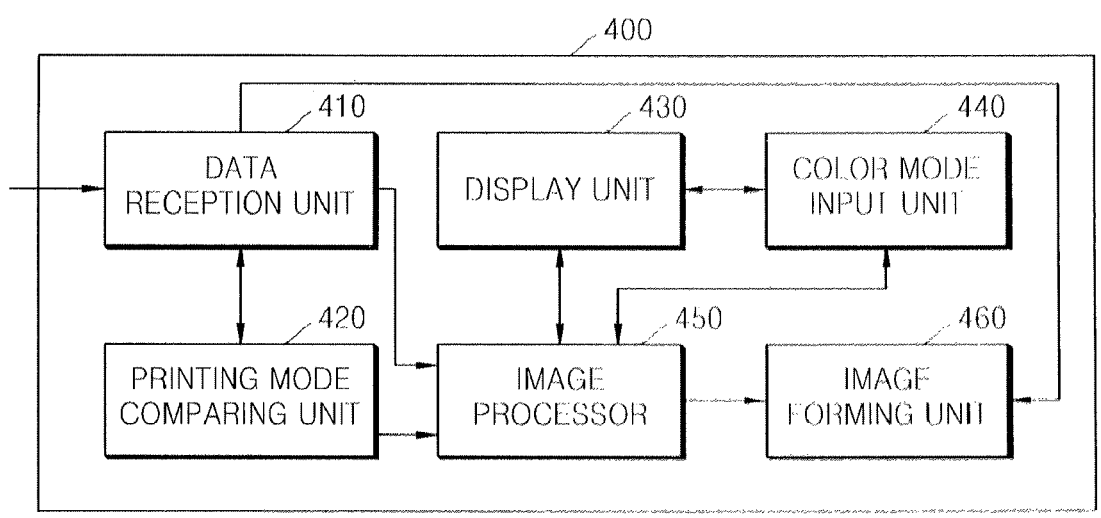
FIG. 4 is a block diagram illustrating an apparatus to process additional information in a printing task, according to an exemplary embodiment of the present general inventive concept.

FIG. 4 is a block diagram illustrating an apparatus 400 to process additional information in a printing task, according to an exemplary embodiment of the present general inventive concept.

Referring to FIG. 4, the apparatus 400 to process additional information in a printing task according to the current embodiment of the present general inventive concept includes a data reception unit 410, a printing mode comparing unit 420, a display unit 430, a color mode input unit 440, an image processor 450, and an image forming unit 460.

The data reception unit 410 receives a printing task including data to be printed. Here, the printing task may be received via a device such as a host which generates the printing task, a server, a device in which the printing task is stored such as a cellular phone or a digital camera, or a separate storage device such as a universal serial bus (USB) memory stick or a memory card. Furthermore, the data to be printed may be received by loading the data stored inside a color image forming device.

The printing mode comparing unit 420 compares a printing mode (i.e. color mode) for the initial data to be printed and printing mode (color mode) for the additional information, determines whether they are the same, and transmits a result of the comparison to the image processor 450. Examples of printing modes include a color printing mode in which black, yellow, magenta, and cyan are used and a monochrome printing mode in which only black is used. Therefore, the printing mode comparing unit 420 compares the printing mode for the initial data to be printed and the printing mode for the additional information, determines whether both of them are either color printing modes or monochrome printing modes, and transmits a result of the comparison to the image processor 450.

The display unit 430 displays printing modes of initial data to be printed and additional information. Furthermore, the display unit 430 provides a user interface in which a reference printing mode to process color can be selected. The user interface is as shown in FIG. 3. Furthermore, if a printing task includes additional information, the display unit 430 displays that the additional information is included in the printing task.

The color mode input unit 440 receives input of a reference printing mode to process color in printing modes of initial data to be printed and additional information, the printing modes being displayed by the display unit 430. A printing mode selected via the color mode input unit 440 is transmitted to the image processor 450.

The image processor 450 changes a color of initial data to be printed or additional information such that printing modes of the initial data to be printed and the additional information become the same. More particularly, if additional information is included in a printing task and printing modes of initial data to be printed and the additional information are different from each other, color of the initial data to be printed or the additional information can be changed such that printing modes of the initial data to be printed and the additional information become the same. In this case, the printing mode for the additional information may be changed according to the printing mode for the initial data to be printed, and then the color of the additional information may be changed according to the changed printing mode. Furthermore, the printing mode for the initial data may be changed according to the printing mode for the additional information, and then the color of the initial data to be printed may be changed according to the changed printing mode. Meanwhile, the color of the initial data to be printed or the additional information may also be changed according to a predetermined printing mode. In this case, the predetermined printing mode may be either a color printing mode or a monochrome printing mode. Furthermore, the image processor 450 can change the color of the initial data to be printed or the additional information according to a printing mode selected via the printing mode input unit 440. However, if a reference printing mode to process color is not input within a predetermined time period, the color of the initial data to be printed or the additional information may be changed according to the predetermined printing mode. The color-processed printing task is transmitted to the image forming unit 460.

The image forming unit 460 prints out a printing task transmitted from the image processor 450. Furthermore, if no additional information is included in the printing task, the printing task is printed out without change of colors. Here, the printing operation includes not only printing the images on recording media, but also storing the images in a printing device or in an external storage device. Therefore, the stored images may be transmitted to another connected device via a network and printed from another device.

Although an apparatus to process additional information is described in the embodiment of FIG. 4 the present general inventive concept, an image forming system including a host device, which generates data to be printed and additional information and transmits a printing task including the generated data to be printed and the additional information, may also be embodied. In other words, an image forming system can be embodied with a host device, which includes a first application generating data to be printed and a second application generating additional information, and transmits a printing task including the generated data to be printed and the additional information, and a printer device, which receives the printing task, changes color of the data to be printed or the additional information according to a printing mode, and prints out the data to be printed and the additional information.

Furthermore, additional information can be generated in a separate server outside a host device. Thus, an image forming system can be embodied with a host device, which generates data to be printed and transmits a printing task including the data to be printed, a server, which receives the printing task, adds additional information to the received printing task, and transmits the printing task including the additional information to a printer device, and a printer device, which receives the printing task from the server, changes color of the data to be printed or the additional information according to a printing mode, and prints out the data to be printed and the additional information.

The exemplary embodiments of the present general inventive concept can also be written as computer programs and can be implemented in general-use digital computers that execute the programs using a computer readable recording medium.

Furthermore, structure of data used in the embodiments of the present general inventive concept can be recorded on a computer readable recording medium by using various methods.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of processing additional information in a printing task, the method comprising:
    receiving a printing task comprising data to be printed and additional information;
    determining a color printing mode of the data to be printed and a color printing mode of the additional information separately from determining the color printing mode of the data to be printed; and
    when the color printing modes are determined to be different, printing the data to be printed and the additional information using the color printing mode of the data to be printed such that a printed result of the additional information matches a printed result of the data to be printed.

2. The method of claim 1, wherein the printing further comprises:
    changing color data of the data to be printed or the additional information to correspond to color data output by one of the color printing mode of the data to be printed or the reference color printing mode.

3. The method of claim 1, wherein color data of the data to be printed or the additional information is changed according to the color printing mode of the data to be printed or the reference color printing mode.

4. The method of claim 1, further comprising:
    displaying the color printing modes of the data to be printed and the additional information.

5. The method of claim 4, further comprising receiving input selecting the reference color printing mode,
    wherein the data to be printed and the additional information are printed out after color data of the data to be printed or the additional information is changed according to the input reference color printing mode.

6. The method of claim 5, wherein the data to be printed and the additional information are printed out after color of the data to be printed or the additional information is changed according to the color printing mode of the data to be printed, when the reference color printing mode is not input within a predetermined time period.

7. The method of claim 4, wherein color printing modes of the data to be printed and the additional information are displayed on at least one of an image forming device performing the printing task and an external device connected to the image forming device.

8. The method of claim 1, wherein the data to be printed and the additional information are printed out after color data of the data to be printed or the additional information is changed.

9. The method of claim 8, wherein the color printing mode of the data to be printed or the reference color printing mode are either a multicolor color printing mode or a monochrome color printing mode.

10. The method of claim 1, wherein the additional information is generated by a host device transmitting the printing task or a separate device other than the host device.

11. The method of claim 1, further comprising:
    displaying that the printing task comprises the additional information.

12. An apparatus to process additional information in a printing task, the apparatus comprising:
    a data reception unit to receive a printing task comprising data to be printed and additional information;
    a printing mode comparing unit that determines a color printing mode of the additional information separately from a color printing mode of the data to be printed, and that determines whether the color printing mode of the data to be printed and the color printing mode of the additional information are different;

an image processor to change color data of the data to be printed or the additional information according to the color printing mode of the data to be printed or the color printing mode of the additional information, when the color printing modes are determined to be different; and an image forming unit to print out the data to be printed and the additional information using one of the color printing mode of the data to be printed or the color printing mode of the additional information.

13. The apparatus of claim 12, wherein the image processor changes color data of the data to be printed or the additional information according to the color printing mode used by the image forming unit.

14. The apparatus of claim 12, further comprising:
a display unit to display the color printing modes of the data to be printed and the additional information.

15. The apparatus of claim 14, further comprising:
a color mode input unit to receive input of the reference color printing mode to process color data of the color printing modes of the data to be printed and the additional information,
wherein the image processor changes color of the data to be printed or the additional information according to the input reference color printing mode.

16. The apparatus of claim 15, wherein the image processor changes color data of the additional information according to the color printing mode of the data to be printed, when the reference printing mode is not input within a predetermined time period.

17. The apparatus of claim 14, wherein the display unit displays that the printing task comprises the additional information.

18. The apparatus of claim 12, wherein the predetermined printing mode is either a multicolor color printing mode or a monochrome color printing mode.

19. The apparatus of claim 12, wherein the additional information is generated by a host device transmitting the printing task or a separate device other than the host device.

20. An image forming system to process additional information of a printing task, the image forming system comprising:
a host device which generates data to be printed and transmits a printing task comprising the data to be printed;
a server which receives the printing task, adds additional information to the received printing task, and transmits the printing task comprising the additional information; and
a printer device to receive the transmitted printing task from the server, to determine a first color printing mode of the data to be printed, to determine a second color printing mode of the additional information separately from determining the color printing mode the data to be printed, and to print out the data to be printed and the additional information using the first color printing mode of the data to be printed, when the first and second color printing modes are determined to be different.

21. A method of processing a printing task, the method comprising:
receiving a printing task comprising data to be printed and additional information;
determining a color printing mode of the data to be printed, and determining a color printing mode of the additional information separately from the determining a color printing mode of the data to be printed, and determining whether the color printing mode of the data to be printed is different than the color printing mode of the additional information; and
printing out the data to be printed, together with the additional information according to same colors using a requested color printing mode selected through a displayed user interface, when the color printing modes of the data to be printed and the additional information are determined to be different.

22. The method of claim 21, wherein the requested printing mode is either a multicolor color printing mode or a monochromatic color printing mode.

23. An apparatus to process additional information in a printing task, the apparatus comprising:
a data reception unit to receive a printing task comprising data to be printed and additional information;
a printing mode comparing unit to determine a color first printing mode of the data to be printed and a second color printing mode of the additional information;
an image processor to change the first color printing mode of the data to be printed to the second color printing mode of the additional information in response to determining that the first and second color printing modes are different; and
an image forming unit to print out each of the data to be printed and the additional information according to the second color printing mode.

* * * * *